(12) United States Patent
Shimizu

(10) Patent No.: US 6,728,071 B2
(45) Date of Patent: Apr. 27, 2004

(54) HEAD ASSEMBLY HAVING A HEAD IC HEAT RADIATING ELEMENT

(75) Inventor: Keishi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 194 days.

(21) Appl. No.: 09/951,166

(22) Filed: Sep. 13, 2001

(65) Prior Publication Data

US 2002/0149881 A1 Oct. 17, 2002

(30) Foreign Application Priority Data

Apr. 12, 2001 (JP) ........................................ 2001-114131

(51) Int. Cl.[7] ................................................ G11B 5/48
(52) U.S. Cl. .................................. 360/244.1; 360/245.9
(58) Field of Search ........................... 360/244.1, 245.9, 360/234.5, 234.4

(56) References Cited

U.S. PATENT DOCUMENTS 6,084,746 A * 7/2000 Shiraishi .................. 360/244.1

* cited by examiner

Primary Examiner—A. J. Heinz
(74) Attorney, Agent, or Firm—Greer, Burns & Crain, Ltd.

(57) ABSTRACT

A disk drive includes a housing, an actuator arm rotatably mounted in the housing, a suspension fixed at a base end portion thereof to a front end portion of the actuator arm, a head slider mounted on a front end portion of the suspension and having an electromagnetic transducer, and a head IC mounted on the suspension in adjacent relationship with the head slider. The disk drive further includes a radiating flexible printed circuit sheet mounted on the suspension and the actuator arm, the radiating flexible printed circuit sheet having a first end portion fixed to the suspension and thermally connected to the head IC and a second end portion fixed to the actuator arm.

11 Claims, 6 Drawing Sheets

HEAD ASSEMBLY HAVING A HEAD IC HEAT RADIATING ELEMENT

BACKGROUND OF THE INVENTION

1. Field of the Invention

The present invention relates to a disk drive, and more particularly to a head assembly for use in a disk drive.

2. Description of the Related Art

In recent years, a magnetic disk drive as a kind of external storage for a computer has been desired to have a small size and a large storage capacity. A method for increasing the storage capacity of a magnetic disk drive is to increase the number of magnetic disks mounted on a spindle motor, and accordingly the spacing of the magnetic disks mounted tends to be decreased in a recent magnetic disk drive. A contact start stop (CSS) type flying magnetic head slider is widely used in a recent magnetic disk drive. The CSS type flying magnetic head slider comes into contact with a magnetic disk in stopping the operation of the magnetic disk drive, while flying a microscopic height from the surface of the magnetic disk by the action of an air flow produced over the surface of the magnetic disk rotating at a high speed in recording/reproducing information.

The CSS type flying magnetic head slider includes an electromagnetic transducer (magnetic head element) for reading/writing information from/to the magnetic disk. The magnetic head slider is supported by a suspension. When the rotation of the magnetic disk is stopped, the magnetic head slider including the electromagnetic transducer comes into contact with the disk surface, whereas when the magnetic disk is in rotation, the electromagnetic transducer included in the magnetic head slider supported to the suspension is moved above the disk surface to a desired track, thereby recording/reproducing information with the electromagnetic transducer.

A portable personal computer such as a notebook personal computer is often carried, and it is therefore required to have high shock resistance. Accordingly, such a personal computer generally employs a load/unload type magnetic disk drive designed so that a head slider is unloaded from the surface of a magnetic disk when the computer is powered off or put into a sleep mode and that the head slider is loaded to the surface of the magnetic disk when the computer is operated. That is, in the load/unload type magnetic disc drive, when the computer is powered off or put into a sleep mode, a horn portion formed at the front end of the head slider is seated on a ramp (inclined portion) of a ramp member provided near the outer circumference of the magnetic disk to retract the head slider flying a microscopic height above the disk surface from the magnetic disk. Accordingly, even when the computer receives shock, it is possible to avoid the possibility that the head slider may collide with the magnetic disk to damage it.

Both in the CSS type magnetic disk drive and in the load/unload type magnetic disk drive, data writing to the magnetic disk and data reading from the magnetic disk are performed by using a read/write head integrated circuit (head IC) mounted on a main printed circuit board provided in the magnetic disk drive. In writing data, a write signal is supplied from the head IC through a relay flexible printed circuit sheet (relay FPC) to the magnetic head element, and the data is written onto the magnetic disk by the magnetic head element according to the write signal. In reading data, a very small electrical signal read by the magnetic head element is supplied through the relay FPC to the head IC incorporating a preamplifier, and this signal is amplified in the head IC.

Thus, the data recorded on the magnetic disk is read by the magnetic head element (electromagnetic transducer). However, since the head IC is mounted on the main printed circuit board in the prior art, the distance between the magnetic head element and the head IC is large, so that a data transfer rate is low. It is considered that the data transfer rate can be increased by mounting the head IC on the suspension in adjacent relationship with the magnetic head slider. However, in the case of simply mounting the head IC on the suspension, the temperature of the head IC becomes high because it is a highly heating element. As a result, the reliability of the head IC is reduced to cause a difficulty in practical use.

SUMMARY OF THE INVENTION

It is therefore an object of the present invention to provide a disk drive which can sufficiently radiate the heat generated from a head IC mounted on a suspension.

It is another object of the present invention to provide a head assembly which can efficiently radiate the heat generated from a head IC mounted on a suspension.

In accordance with an aspect of the present invention, there is provided a disk drive comprising a housing; an actuator arm rotatably mounted in the housing; a suspension fixed at a base end portion thereof to a front end portion of the actuator arm; a head slider mounted on a front end portion of the suspension and having an electromagnetic transducer; a head IC mounted on the suspension; and a radiating flexible printed circuit sheet mounted on the suspension and the actuator arm, the radiating flexible printed circuit sheet having a first end portion fixed to the suspension and thermally connected to the head IC and a second end portion fixed to the actuator arm.

The suspension has a first printed wiring pattern for connecting the electromagnetic transducer and the head IC and a second printed wiring pattern for connecting the head IC to an external circuit. Preferably, the head IC is connected through metal bumps to the first and second printed wiring patterns. Preferably, the radiating flexible printed circuit sheet comprises an insulating layer formed of polyimide or the like and a copper foil embedded in the insulating layer. The disk drive further comprises a relay flexible printed circuit sheet bonded to a side surface of the actuator arm, and the second printed wiring pattern is connected to the relay flexible printed circuit sheet.

With the above structure of the disk drive according to the present invention, the heat generated from the head IC mounted on the suspension can be efficiently transferred through the radiating flexible printed circuit sheet to the actuator arm, thereby preventing a temperature rise of the head IC to a given temperature or higher.

In accordance with another aspect of the present invention, there is provided a head assembly comprising a suspension; a head slider mounted on a front end portion of the suspension and having an electromagnetic transducer; a head IC mounted on the suspension; and a radiating flexible printed circuit sheet mounted on the suspension, the radiating flexible printed circuit sheet having a first end portion fixed to the suspension and thermally connected to the head IC and a second end portion extending beyond a base end portion of the suspension.

Preferably, the suspension has a first printed wiring pattern for connecting the electromagnetic transducer and the head IC and a second printed wiring pattern for connecting the head IC to an external circuit.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
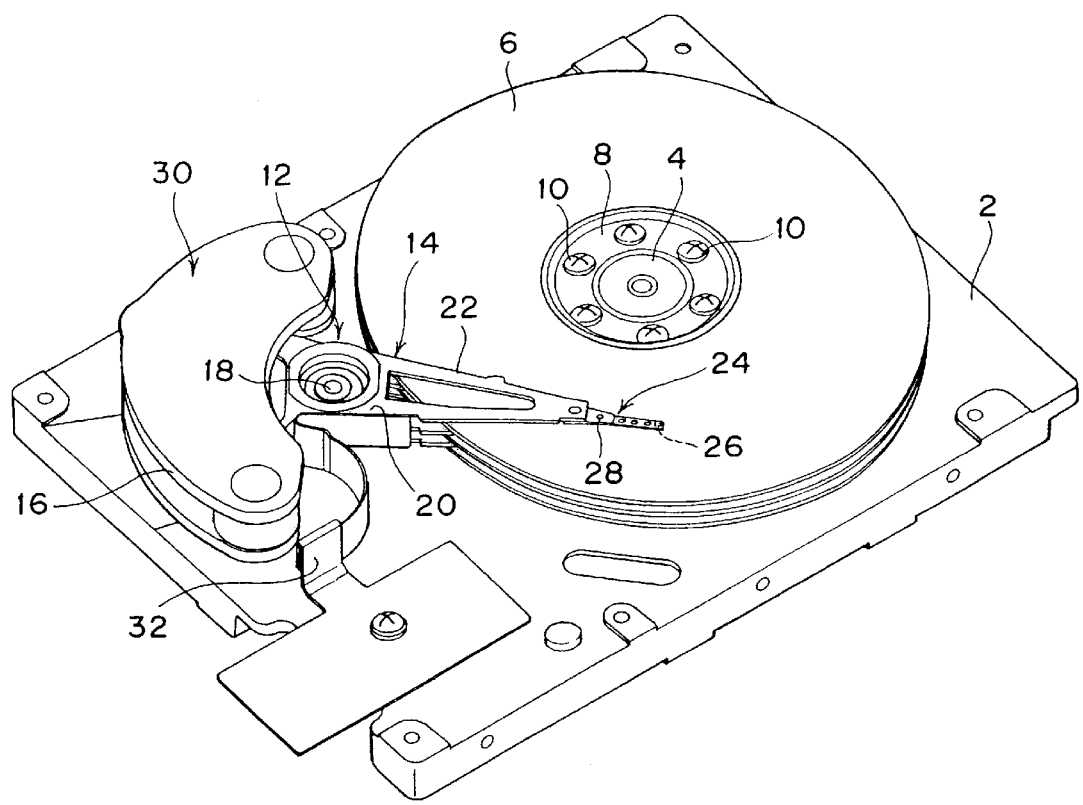
FIG. 1 is a perspective view of a magnetic disk drive according to a preferred embodiment of the present invention in the condition where a cover is removed.

Referring to FIG. 1, there is shown a perspective view of a magnetic disk drive in the condition where a cover is removed. Reference numeral 2 denotes a base of the magnetic disk drive. A shaft 4 is fixed to the base 2, and a spindle hub (not shown) is rotatably mounted on the shaft 4. The spindle hub is driven by a DC motor (not shown) to rotate about the shaft 4. A plurality of magnetic disks 6 and spacers (not shown) are mounted on the spindle hub so as to be alternately stacked. That is, the plural magnetic disks 6 are fixedly mounted on the spindle hub by securing a disk clamp 8 to the spindle hub by means of a plurality of screws 10, and are equally spaced a given distance by the spacers.

Reference numeral 12 denotes a rotary actuator consisting of an actuator arm assembly 14 and a magnetic circuit 16. The actuator arm assembly 14 is rotatable about a shaft 18 fixed to the base 2. The actuator arm assembly 14 includes an actuator block 20 rotatably mounted on the shaft 18 through a pair of bearings (not shown), a plurality of actuator arms 22 extending horizontally from the actuator block 20 in one direction, and a head assembly 24 fixed to a front end portion of each actuator arm 22. Each head assembly 24 includes a head slider 26 having an electromagnetic transducer (magnetic head element) for reading/writing data from/to the corresponding magnetic disk 6, and a suspension 28 having a front end portion supporting the head slider 26 and a base end portion fixed to the corresponding actuator arm 22.

Although not shown in FIG. 1, a head integrated circuit (head IC) is mounted on the suspension 28 in adjacent relationship with the head slider 26. A coil (not shown) is supported on the opposite side of the actuator arms 22 with respect to the shaft 18. The coil is inserted in a gap of the magnetic circuit 16. The magnetic circuit 16 and the coil constitute a voice coil motor (VCM) 30. Reference numeral 32 denotes a main flexible printed circuit board (main FPC) for supplying a write signal to the electromagnetic transducer and for taking a read signal from the electromagnetic transducer. One end of the main FPC 32 is fixed to a side surface of the actuator block 20.

Figure 2:
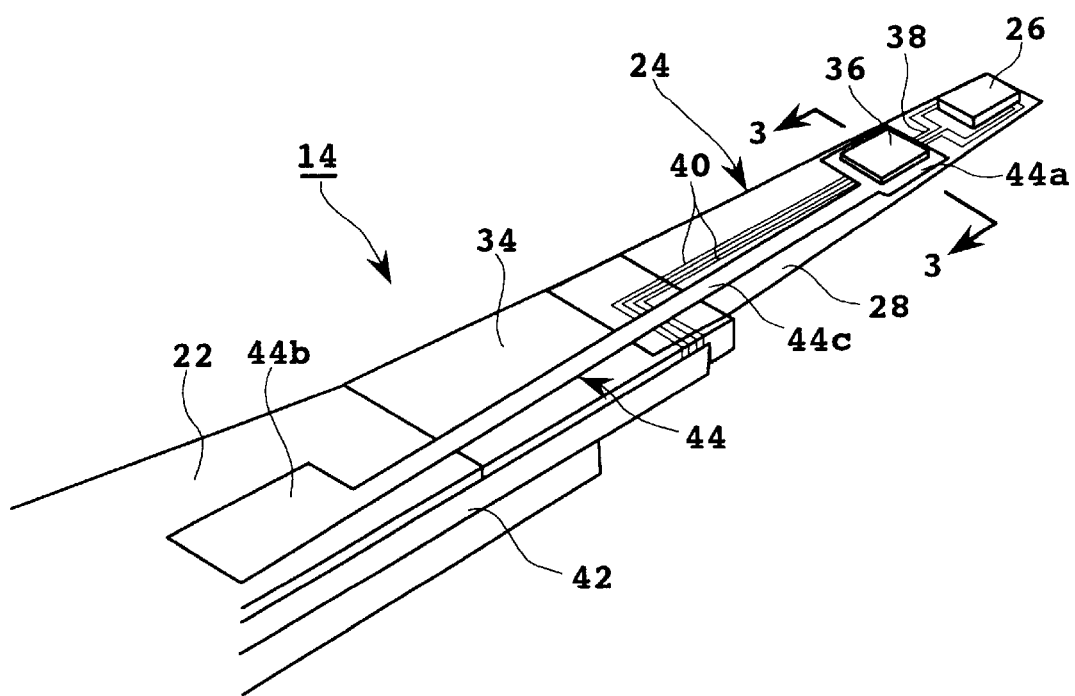
FIG. 2 is a perspective view of an actuator arm assembly in the magnetic disk drive.

Referring to FIG. 2, there is shown a perspective view of the actuator arm assembly 14. A spacer 34 is fixed to the front end portion of the actuator arm 22, and the head assembly 24 is fixed at its base end portion to the spacer 34. The head assembly 24 includes the suspension 28. The suspension 28 is formed of stainless steel. The head slider 26 having the electromagnetic transducer (magnetic head element) is mounted on the front end portion of the suspension 28. Further, a head IC 36 is mounted on the suspension 28 in adjacent relationship with the head slider 26.

Figure 3:
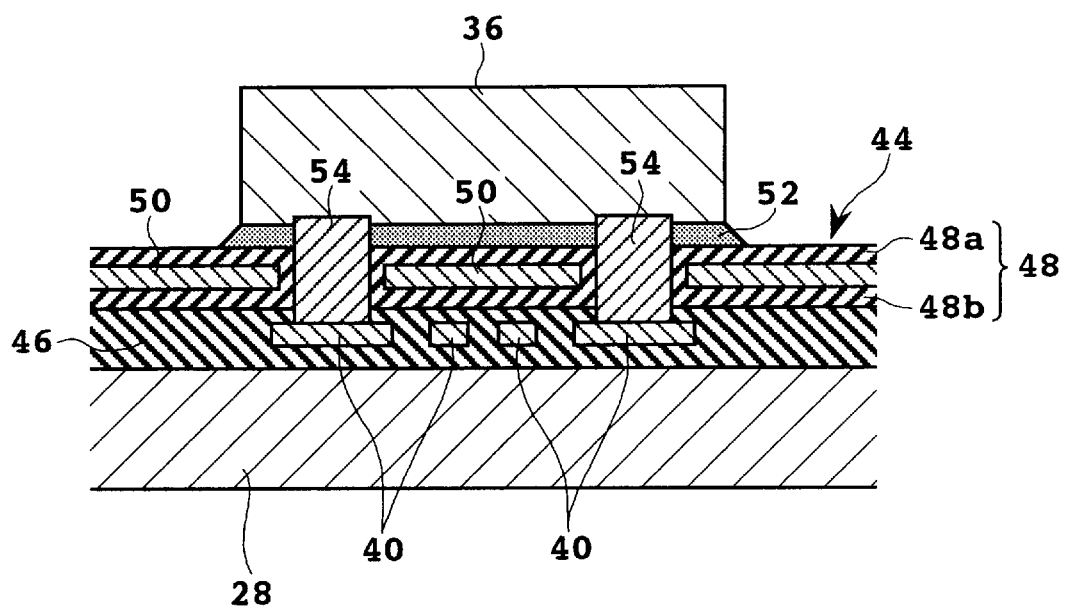
FIG. 3 is a cross section taken along the line 3—3 in FIG. 2.

A first printed wiring pattern 38 for connecting the electromagnetic transducer of the head slider 26 and the head IC 36 is formed on the suspension 28, and a second printed wiring pattern 40 for connecting the head IC 36 and a relay flexible printed circuit sheet (relay FPC) 42 is also formed on the suspension 28. The relay FPC 42 is connected to the main FPC 32 shown in FIG. 1. Referring to FIG. 3, there is shown a cross section taken along the line 3—3 in FIG. 2. The second printed wiring pattern 40 is composed of a plurality of lead lines, and they are embedded in an insulating layer 46 formed of polyimide, for example. The second printed wiring pattern 40 has a multilayer structure including a copper layer as a primary layer, a nickel layer deposited on the copper layer, and a gold layer deposited on the nickel layer. Similarly, the first printed wiring pattern 38 has a multilayer structure including a copper layer as a primary layer, a nickel layer deposited on the copper layer, and a gold layer deposited on the nickel layer.

Referring again to FIG. 2, a radiating flexible printed circuit sheet (radiating FPC) 44 is bonded on the suspension 28, the spacer 34, and the actuator arm 22. The radiating FPC 44 has a first enlarged end portion 44a positioned under the head IC 36, a second enlarged end portion 44b bonded to the actuator arm 22, and a narrow portion 44c connecting the first and second enlarged end portions 44a and 44b.

Figure 4:
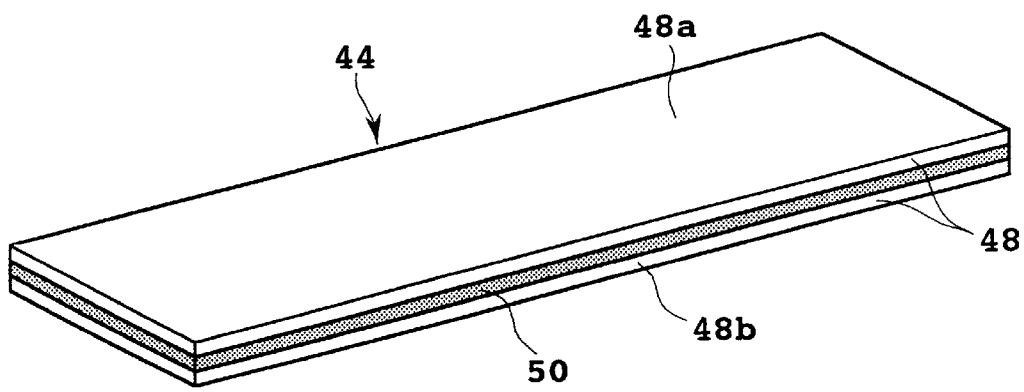
FIG. 4 is a schematic perspective view of a radiating FPC.

As shown in FIG. 4, the radiating FPC 44 has such a structure that a copper foil 50 is embedded in an insulating layer 48 of polyimide or the like. The insulating layer 48 is composed generally of an upper layer portion 48a and a lower layer portion 48b. The radiating FPC 44 has a size such that the width of the narrow portion 44c is 0.4 mm, the thickness of the copper foil 50 is 18 $\mu$m, and the thickness of each of the upper and lower layer portions 48a and 48b of the insulating layer 48 is 12 $\mu$m, for example. The thermal conductivity of the copper foil 50 is 400 W/mK, and the thermal conductivity of the insulating layer 48 is 0.15 W/mK.

Referring again to FIG. 3, the head IC 36 is bonded on the radiating FPC 44 by a resin 52 such as epoxy resin. The second printed wiring pattern 40 is connected to electrodes of the head IC 36 by metal bumps 54 formed of a solder or the like. A gap is defined between the copper foil 50 of the radiating FPC 44 and each metal bump 54 to prevent a short circuit between the second printed wiring pattern 40 and the copper foil 50 of the radiating FPC 44. Although not especially shown, the connection structure between electrodes of the head IC 36 and the first printed wiring pattern 38 is similar to that between the electrodes of the head IC 36 and the second printed wiring pattern 40 shown in FIG. 3.

In operation, when the head IC 36 is driven to read/write data from/to the magnetic disk 6 through the electromagnetic transducer built in the head slider 26, the head IC 36 is heated to high temperatures because of heat generation from a head driving preamplifier included in the head IC 36. The heat generated from the head IC 36 is transmitted to the first enlarged end portion 44a of the radiating FPC 44, next transferred by heat conduction through the narrow portion 44c to the second enlarged end portion 44b of the radiating FPC 44, and finally radiated to the actuator arm 22 formed of aluminum, for example. Since the actuator arm 22 has a sufficiently large heat capacity, the heat generated from the head IC 36 can be efficiently radiated through the radiating FPC 44 to the actuator arm 22.

In particular, the heat generated from the head IC 36 can be directly received by the metal bumps 54 and next transmitted to the copper foil 50 of the radiating FPC 44, thereby ensuring a good radiation efficiency. Accordingly, the temperature of the head IC 36 can be suppressed to a given temperature or less, thereby ensuring the reliability of operation of the head IC 36. Further, since the radiating FPC 44 is sufficiently thin and it is bonded to the suspension 28, the spacer 34, and the actuator arm 22, the actuator arm assembly 14 does not receive any excess air resistance during the operation of the magnetic disk drive, and the motion characteristics of the head slider 26 is not affected by the radiating FPC 44.

Figure 5A:
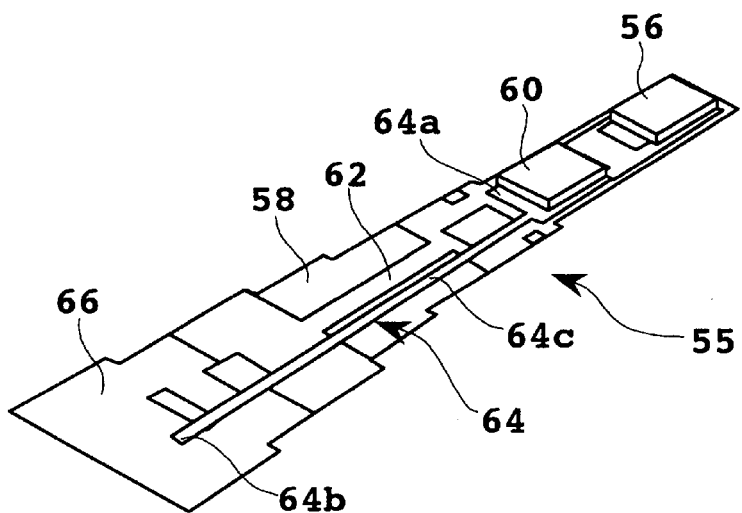
FIG. 5A is a perspective view of a numerical analysis model of a head assembly according to the present invention.
Figure 5B:
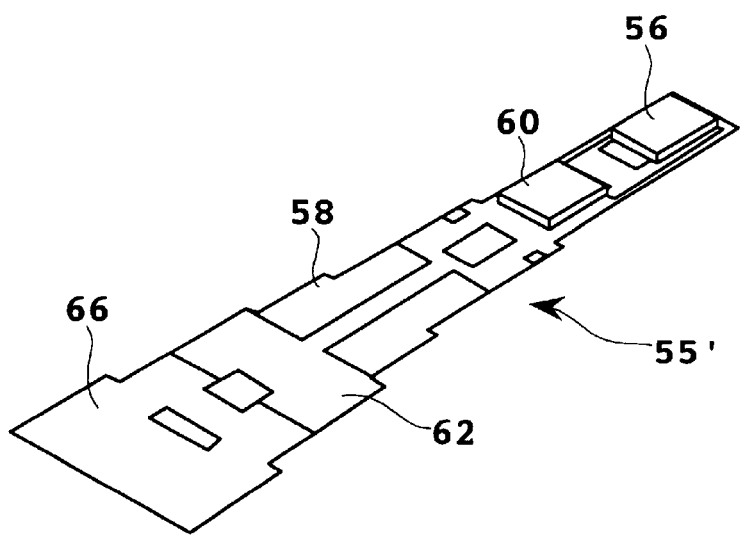
FIG. 5B is a perspective view of a numerical analysis model of a head assembly in the prior art.

Referring to FIG. 5A, there is shown a perspective view of a numerical analysis model for verification of the effect of the present invention. FIG. 5B is a similar view in a conventional structure having no radiating FPC. In FIG. 5A, reference numeral 55 generally denotes a head assembly having a suspension 58 according to the present invention. A head slider 56 is mounted on the suspension 58 at its front end portion, and a head IC 60 is also mounted on the suspension 56 in adjacent relationship with the head slider 56.

The suspension 58 is connected at its base end portion to a spacer 66. A wiring pattern 62 is formed on the suspension 58. The head IC 60 and the spacer 66 are connected by a radiating FPC 64. In FIG. 5B, reference numeral 55' generally denotes a head assembly having a conventional structure. That is, the head assembly 55' does not have the radiating FPC 64 shown in FIG. 5A. The radiating FPC 64 is similar to the radiating FPC 44 shown in FIGS. 2 to 4 as having a size such that the width of a narrow portion 64c is 0.4 mm, the thickness of a copper foil is 18 μm, and the thickness of each insulating layer portion is 12 μm. Further, the thermal conductivity of the copper foil is 400 W/mK and the thermal conductivity of the insulating layer is 0.15 W/mK.

Figure 6A:
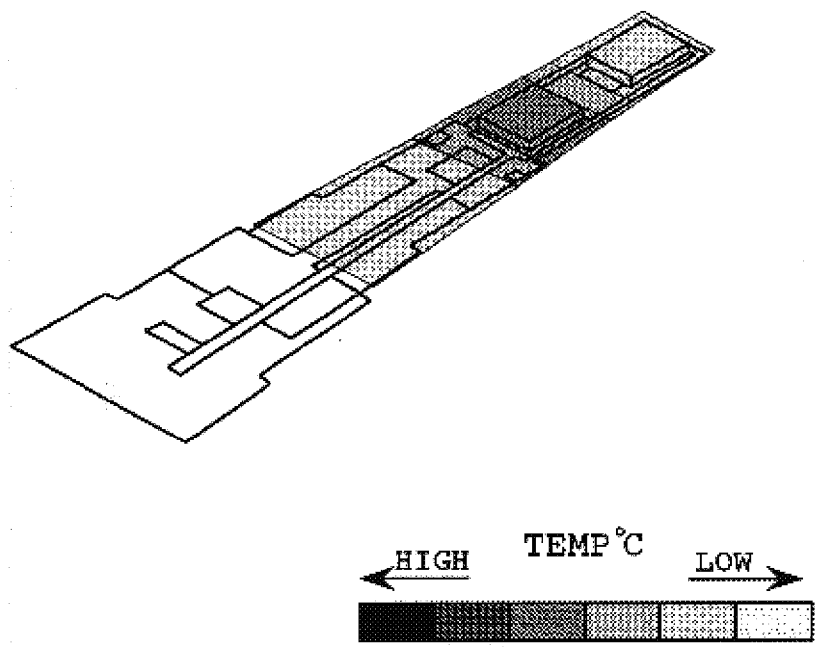
FIG. 6A is a schematic view showing a temperature distribution by the model shown in FIG. 5A.
Figure 6B:
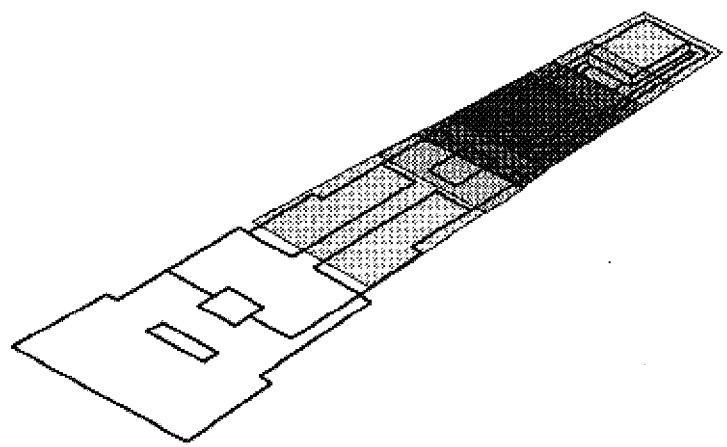
FIG. 6B is a schematic view showing a temperature distribution by the model shown in FIG. 5B.

An appropriate quantity of heat was given to the head IC 60 and a uniform flow velocity was given to the periphery of the head IC 60 to perform a steady-state thermal fluid analysis on both the models shown in FIGS. 5A and 5B. The results of this analysis are shown in FIGS. 6A and 6B. FIG. 6A shows a temperature distribution according to the present invention, and FIG. 6B shows a temperature distribution in the conventional structure. As apparent from FIGS. 6A and 6B, the temperature of the head IC 60 in the structure of the present invention is lower than that in the conventional structure. Letting ΔRja denote a thermal resistance between the head IC 60 and its peripheral environment in the analysis model according to the present invention, a cooling effect of ΔRja=50° C./W was obtained.

According to the present invention as described above, the head IC mounted on the suspension can be efficiently cooled. As a result, a temperature rise of the head IC up to a given temperature or higher can be prevented to thereby ensure the operational reliability of the head IC. Furthermore, the head IC can be positioned in close proximity to the head slider having the electromagnetic transducer. Accordingly, a data transfer rate can be increased as compared with a conventional arrangement such that a head IC is mounted on a main printed circuit board.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A disk drive comprising:

a housing;

an actuator arm rotatably mounted in said housing;

a suspension fixed at a base end portion thereof to a front end portion of said actuator arm;

a head slider mounted on a front end portion of said suspension and having an electromagnetic transducer;

a head IC mounted on said suspension; and a radiating flexible printed circuit sheet mounted on said suspension and said actuator arm, said radiating flexible printed circuit sheet having a first end portion fixed to said suspension and thermally connected to said head IC and a second end portion fixed to said actuator arm.

2. A disk drive according to claim 1, wherein said suspension has a first printed wiring pattern for connecting said electromagnetic transducer and said head IC and a second printed wiring pattern for connecting said head IC to an external circuit.

3. A disk drive according to claim 2, wherein said head IC is connected through metal bumps to said first and second printed wiring patterns.

4. A disk drive according to claim 2, further comprising a relay flexible printed circuit sheet provided along a side surface of said actuator arm;

said second printed wiring pattern being connected to said relay flexible printed circuit sheet.

5. A disk drive according to claim 1, wherein said radiating flexible printed circuit sheet comprises an insulating layer and a copper foil embedded in said insulating layer.

6. A disk drive according to claim 5, wherein said radiating flexible printed circuit sheet is bonded to said suspension and said actuator arm.

7. A head assembly comprising:

a suspension;

a head slider mounted on a front end portion of said suspension and having an electromagnetic transducer;

a head IC mounted on said suspension; and a radiating flexible printed circuit sheet mounted on said suspension, said radiating flexible printed circuit sheet having a first end portion fixed to said suspension and thermally connected to said head IC and a second end portion extending beyond a base end portion of said suspension.

8. A head assembly according to claim 7, wherein said suspension has a first printed wiring pattern for connecting said electromagnetic transducer and said head IC and a second printed wiring pattern for connecting said head IC to an external circuit.

9. A head assembly according to claim 8, wherein said head IC is connected through metal bumps to said first and second printed wiring patterns.

10. A head assembly according to claim 7, wherein said radiating flexible printed circuit sheet comprises an insulating layer and a copper foil embedded in said insulating layer.

11. A head assembly according to claim 10, wherein said radiating flexible printed circuit sheet is bonded to said suspension.

* * * * *

UNITED STATES PATENT AND TRADEMARK OFFICE
CERTIFICATE OF CORRECTION

PATENT NO. : 6,728,071 B2
DATED : April 27, 2004
INVENTOR(S) : Shimizu

It is certified that error appears in the above-identified patent and that said Letters Patent is hereby corrected as shown below:

<u>Column 6,</u>
Line 51, delete "suspension," and insert -- suspension wherein heat is conducted away from said head IC toward said second end portion -- therefor.

Signed and Sealed this

Twenty-first Day of December, 2004

JON W. DUDAS
*Director of the United States Patent and Trademark Office*